(12) United States Patent
Carter

(10) Patent No.: US 9,620,034 B2
(45) Date of Patent: Apr. 11, 2017

(54) METHODS AND APPARATUS TO EXPOSE ENCLOSURE LABELS

(71) Applicant: Fisher Controls International LLC, Marshalltown, IA (US)

(72) Inventor: Perry Keith Carter, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 338 days.

(21) Appl. No.: 14/189,765

(22) Filed: Feb. 25, 2014

(65) Prior Publication Data

US 2015/0243192 A1  Aug. 27, 2015

(51) Int. Cl.
*G09F 3/10* (2006.01)
*G09F 3/18* (2006.01)
*F16P 1/02* (2006.01)

(52) U.S. Cl.
CPC ............... *G09F 3/18* (2013.01); *F16P 1/02* (2013.01); *G09F 3/10* (2013.01); *Y10T 29/49826* (2015.01)

(58) Field of Classification Search
CPC ...... G09F 3/04; G09F 1/04; G09F 3/10; G09F 3/0288; B65D 23/14
See application file for complete search history.

(56) References Cited

U.S. PATENT DOCUMENTS 4,736,861 A * 4/1988 Basili ................. B65D 21/0217
  206/404
8,296,981 B1 * 10/2012 Gardinier ................. G09F 7/10
  40/312
2011/0048556 A1  3/2011 Carter et al.
2011/0315567 A1 * 12/2011 Boynton ................. A45C 11/16
  206/6.1

FOREIGN PATENT DOCUMENTS

WO  2013178733 A1  12/2013

OTHER PUBLICATIONS

Emerson Process Management, "FieldVue DVC6200 Series Digital Valve Controllers: Higher Process Reliability and Performance," published Feb. 2011 (4 pages).
Patent Cooperation Treaty, "International Search Report," issued in connection with PCT Application No. PCT/US2015/017418, mailed on Jun. 19, 2015, (5 pages).

(Continued)

Primary Examiner — Cassandra Davis
(74) Attorney, Agent, or Firm — Hanley, Flight & Zimmerman, LLC

(57) ABSTRACT

Methods and apparatus to expose enclosure labels are disclosed. An example apparatus includes a first enclosure having a first characteristic, a first label indicative of the first characteristic and fixed to an outer surface of the first enclosure, and a second enclosure to couple to the first enclosure. The second enclosure is to cover the first label when the second enclosure is coupled to the first enclosure. The first and second enclosures have a second characteristic when the second enclosure is coupled to the first enclosure. The example apparatus also include a second label indicative of the second characteristic and fixed to an outer surface of the second enclosure. The second label is to be exposed when the second enclosure is coupled to the first enclosure.

11 Claims, 5 Drawing Sheets

(56) References Cited

OTHER PUBLICATIONS

Patent Cooperation Treaty, "Written Opinion," issued in connection with PCT Application No. PCT/US2015/017418, mailed on Jun. 19, 2015, (8 pages).
Fisher Controls International LLC, "Fieldvue Instrumentation, Improving Safety Instrumented System Reliability", Aug. 1, 2002, Retrieved from the Internet: URL:http://euedocs.emersonprocess.co.uk/groups/public/documents/markcom/brh_instrumentationvalve_germa.pdf, Retrieved on Jun. 9, 2015, (8 pages).
Fisher Controls International LLC, "Fisher GX Control Valves", Feb. 1, 2011, Retrieved from the Internet: URL:http://www.documentation.emersonprocess/com/groups/public/documents/brochures/d351047x012.pdf, Retrieved on Jun. 9, 2015, (8 pages).

\* cited by examiner

METHODS AND APPARATUS TO EXPOSE ENCLOSURE LABELS

FIELD OF THE DISCLOSURE

This patent relates generally to enclosure labels and, more particularly, to methods and apparatus to expose enclosure labels.

BACKGROUND

Fluid regulators are commonly used in process control systems to control flow rates and/or pressures of various fluids (e.g., liquids, gases, etc.) through a valve. An instrument (e.g., a controller or a positioner) is often employed to supply control fluid (e.g., air) to the fluid regulator to position a flow control member (e.g., a valve gate, a plug, a closure member, etc.) to regulate the fluid flow through the valve.

Some instruments that supply control fluid to a fluid regulator are coupled to a valve body of the fluid regulator. In some instances, the instrument and the fluid regulator are installed in hazardous locations. In some such instances, a nameplate or label is fixed to the instrument to indicate in which category of hazardous locations the instrument is approved to be installed.

SUMMARY

In one example, an apparatus includes a first enclosure having a first characteristic, a first label indicative of the first characteristic and fixed to an outer surface of the first enclosure, and a second enclosure to couple to the first enclosure. The second enclosure is to cover the first label when the second enclosure is coupled to the first enclosure. The first and second enclosures have a second characteristic when the second enclosure is coupled to the first enclosure. The example apparatus also include a second label indicative of the second characteristic and fixed to an outer surface of the second enclosure. The second label is to be exposed when the second enclosure is coupled to the first enclosure.

In another example, a method for assembling a modular instrument includes coupling a first label to a first enclosure. The first enclosure has a first characteristic, and the first label is indicative of the first characteristic. The example method includes coupling a second label to a second enclosure and coupling the second enclosure to the first enclosure. The coupled first and second enclosures have a second characteristic, the second label is indicative of the second characteristic, and the second enclosure covers the first label of the first enclosure when the second enclosure couples to the first enclosure.

In another example, an example apparatus includes first means for enclosing having a first characteristic, first means for labeling associated with the first characteristic and coupled to an outer surface of the first means for enclosing, and second means for enclosing to couple to the first means for enclosing. The second means for enclosing is to cover the first means for labeling when the second means for enclosing is coupled to the first means for enclosing. The first and second means for enclosing have a second characteristic when the second means for enclosing is coupled to the first means for enclosing. The example apparatus includes second means for labeling associated with the second characteristic and coupled to an outer surface of the second means for enclosing. The second means for labeling is to be exposed when the second means for enclosing is coupled to the first means for enclosing.

Figure 1:
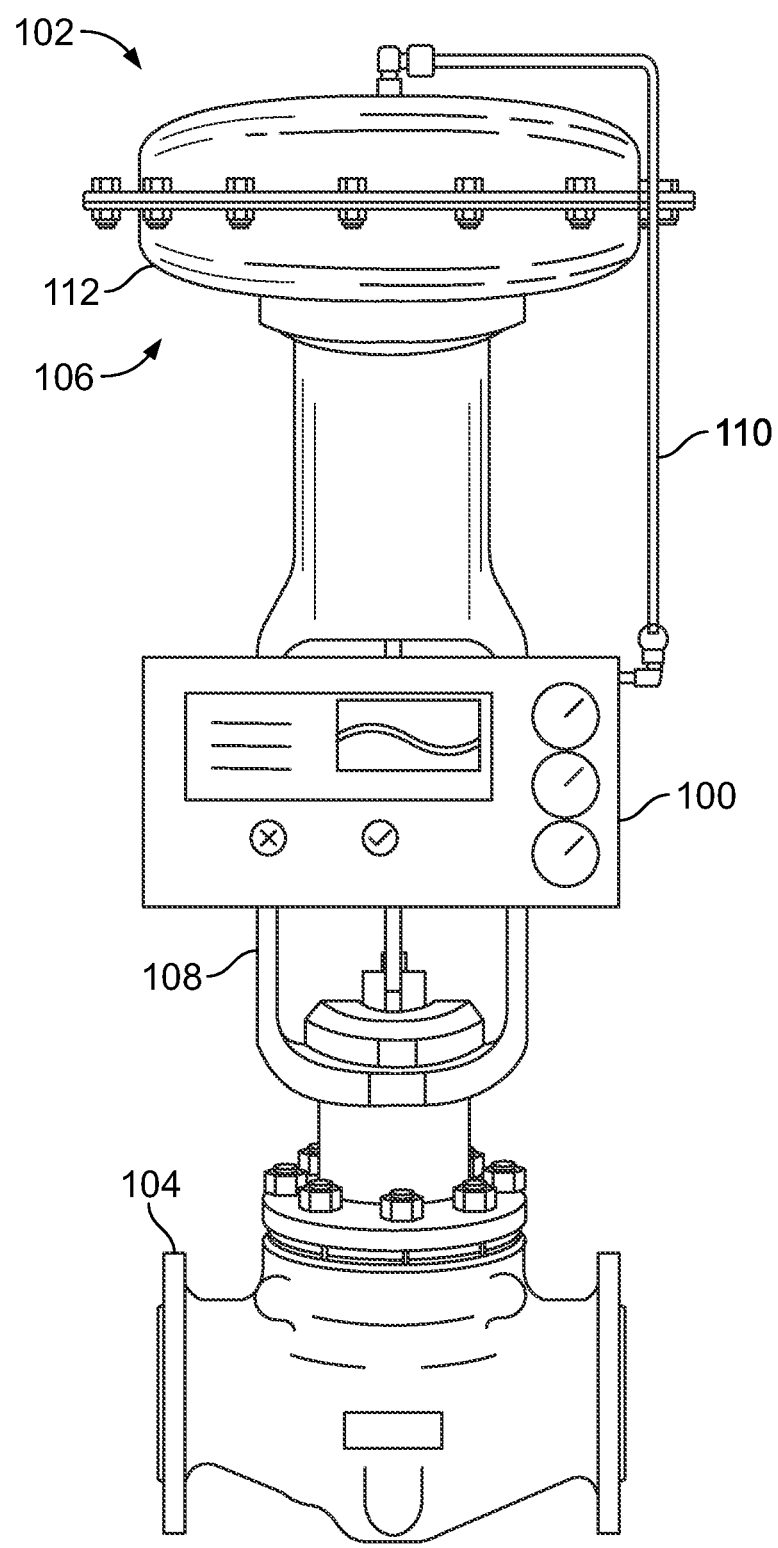
FIG. 1 shows an example modular instrument in accordance with the teachings herein coupled to a control valve assembly.

The figures are not to scale. Instead, to clarify multiple layers and regions, the thicknesses of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Many known fluid regulators employ an instrument (e.g., a controller or a positioner) to supply control fluid to a pressure chamber of the fluid regulator. The control fluid provided by the instrument positions a flow control member (e.g., a plug) relative to a valve seat to regulate fluid flow through a valve. The instrument provides the control fluid to the pressure chamber to move the flow control member to a desired position. In some instances, the instrument subsequently measures an actual position of the flow control member to ensure that the flow control member has moved to the desired position. The accuracy of the actual position relative to the desired position is, in part, dependent upon the distance the control fluid travels between the instrument and the pressure chamber. To reduce the distance between the instrument and the pressure chamber and, thus, increase the precision of the instrument, many known instruments are positioned near the fluid regulator. However, in such instances, the instrument must be able to withstand any hazardous location in which the fluid regulator is installed.

Hazardous locations are areas in which flammable materials that have the potential to form an explosive environment are handled. Many third party agencies (e.g., the National Fire Protection Agency (NFPA), FM Global, Canadian Standards Association (CSA), ATEX, and International Electrotechnical Commission (IEC)) have created hazardous location categories and have set forth standards (e.g., the National Electric Code (NEC) of the NFPA, IEC International Standards, and the Canadian Electrical Code (CEC) of the CSA) for instruments, enclosures and/or equipment that are to be installed in the hazardous locations. Some types of hazardous locations have corresponding standards that require equipment installed in such a location to be intrinsically-safe. For example, intrinsically-safe equipment restricts the amount of electricity available under fault conditions to prevent the equipment from sparking in the explosive environment. Other types of hazardous locations have corresponding standards that require equipment to be non-incendive. For example, non-incendive equipment restricts the amount of electricity available under normal operating conditions to prevent the equipment from sparking in the explosive environment. Other types of hazardous locations have corresponding standards that require instruments, enclosures and/or equipment to be explosion-proof. For example, explosion-proof equipment withstands an explosion from within and prevents any spark, flash, or ignition that would otherwise form in the hazardous environment.

Many third party agencies require an instrument installed in a hazardous location to contain a label that indicates the hazardous locations within which the instrument can be used. Such third party agencies typically require that the label be fixed to an exterior surface of the instrument to enable a person to easily view the label. To prevent the instrument from being improperly labeled, the third party agencies typically require the manufacturers of the instrument or another person approved by the agency to label the instrument and typically prohibit any other person from tampering with the label. To ensure that the labeled instrument continues to comply with the applicable standards, modifications to the instrument are typically prohibited without approval from a person designated by the agency. However, having a person designated by the agency visit the installation site and approve the modifications to the instrument is oftentimes impractical and/or prohibitively expensive.

To reduce assembly and installation costs associated with labeling instruments in accordance with the third party agency, many known instruments are constructed to meet the requirements of multiple types of hazardous locations. For example, some known instruments are constructed to be non-incendive, intrinsically-safe, and explosion-proof. However, for instances in which only a non-incendive or an intrinsically-safe rating is required, such instruments are significantly overdesigned and, thus, unnecessarily expensive.

The example modular instruments described herein substantially reduce production and installation costs of instruments that can be installed in a variety of hazardous locations. In particular, the example modular instruments may be tailored to the standards of the particular types of hazardous locations in which the instrument is installed, while also satisfying the labeling requirements of a third party agency.

An example modular instrument described herein includes a base enclosure compliant with the safety requirements (e.g., requirements that the instrument have a non-incendive or intrinsically-safe rating) of a first hazardous location category or type. A first label is fixed and/or coupled to the base enclosure and indicates that the base enclosure of the modular instrument complies with the standards of the first hazardous location type. For example, to comply with the standards of the applicable third party agency, the first label is fixed and/or coupled to the base by a person approved by the third party agency (e.g., the manufacturer of the base enclosure) at a site approved by the third party agency (e.g., the manufacturing site of the base enclosure).

The example modular instrument may also include a second enclosure that is to couple to the base enclosure. The modular instrument formed by the coupled base and second enclosures is in accordance or compliant with the standards (e.g., the modular instrument has an explosion-proof rating) of a second hazardous location type that is different than the first hazardous location type. In other words, by coupling the second enclosure to the base enclosure, the rating of the modular instrument changes from a first rating to a second rating. To indicate that the coupled second and base enclosures of the modular instrument are compliant with the standards of the second type or category of hazardous location, a second label is fixed and/or coupled to the second enclosure. For example, the first label is covered by the second enclosure when the base and second enclosures are coupled. In such instances, to prevent the modular instrument from being mislabeled, only the second label that corresponds to the second hazardous location type or category is viewable by a person when the second enclosure is coupled to the base enclosure.

FIG. 1 illustrates an example instrument 100 in accordance with the teachings herein. While FIG. 1 depicts the example instrument 100 installed with a globe valve and a diaphragm actuator, the example instrument 100 is not limited to being installed with such a combination. For example, the example instrument 100 can be installed in conjunction with a piston actuator and/or a ball, butterfly, plug, or gate valve. As illustrated in FIG. 1, the example instrument 100 (e.g., a controller or a positioner) is coupled to a control valve assembly 102 that controls fluid flow through a fluid valve 104. For example, the control valve assembly 102 includes an actuator 106, a yoke 108, and tubing 110. The yoke 108 is coupled to the actuator 106 and the fluid valve 104. The actuator 106 includes an actuator casing 112, a diaphragm disposed in a cavity of the actuator casing 112, and a pressure chamber defined by the actuator casing 112 and the diaphragm. As illustrated in FIG. 1, the tubing 110 couples to the actuator casing 112 and the example instrument 100.

In operation, the example instrument 100 provides control fluid (e.g., pneumatic air) to the pressure chamber of the actuator 106 via the tubing 110. When the control fluid within the pressure chamber creates a pressure differential across the diaphragm, a force is exerted to move the diaphragm within the actuator 106 in a rectilinear direction relative to the fluid valve 104. In turn, the diaphragm causes a valve plug operatively coupled to the diaphragm to move relative to a valve seat of the fluid valve 104 to open and/or close the fluid valve 104. Thus, the control fluid provided by the modular instrument 100 controls the fluid flow through the fluid valve 104.

As illustrated in FIG. 1, the modular instrument 100 is coupled to the yoke 108 of the control valve assembly 102. Alternatively, the modular instrument 100 may be positioned at any other location proximate to the control valve assembly 102. Positioning the instrument 100 near the control valve assembly 102 reduces the distance the control fluid travels between the instrument 100 and the actuator casing 112, which, in turn, enables the modular instrument 100 to more precisely control the position of the diaphragm.

However, positioning the modular instrument 100 near the control valve assembly 102 requires the modular instrument 100 to be positioned within a hazardous environment in which the control valve assembly 102 is positioned. To satisfy safety standards of third party agencies, a label (e.g., a first label 218 of FIG. 2 or a second label 402 of FIG. 4) is fixed to the modular instrument 100 to indicate in which hazardous location categories the modular instrument 100 may be installed. For example, the label is fixed to an exposed outer surface of the modular instrument 100 to enable a person to easily identify with which standards the modular instrument 100 complies.

Figure 2:
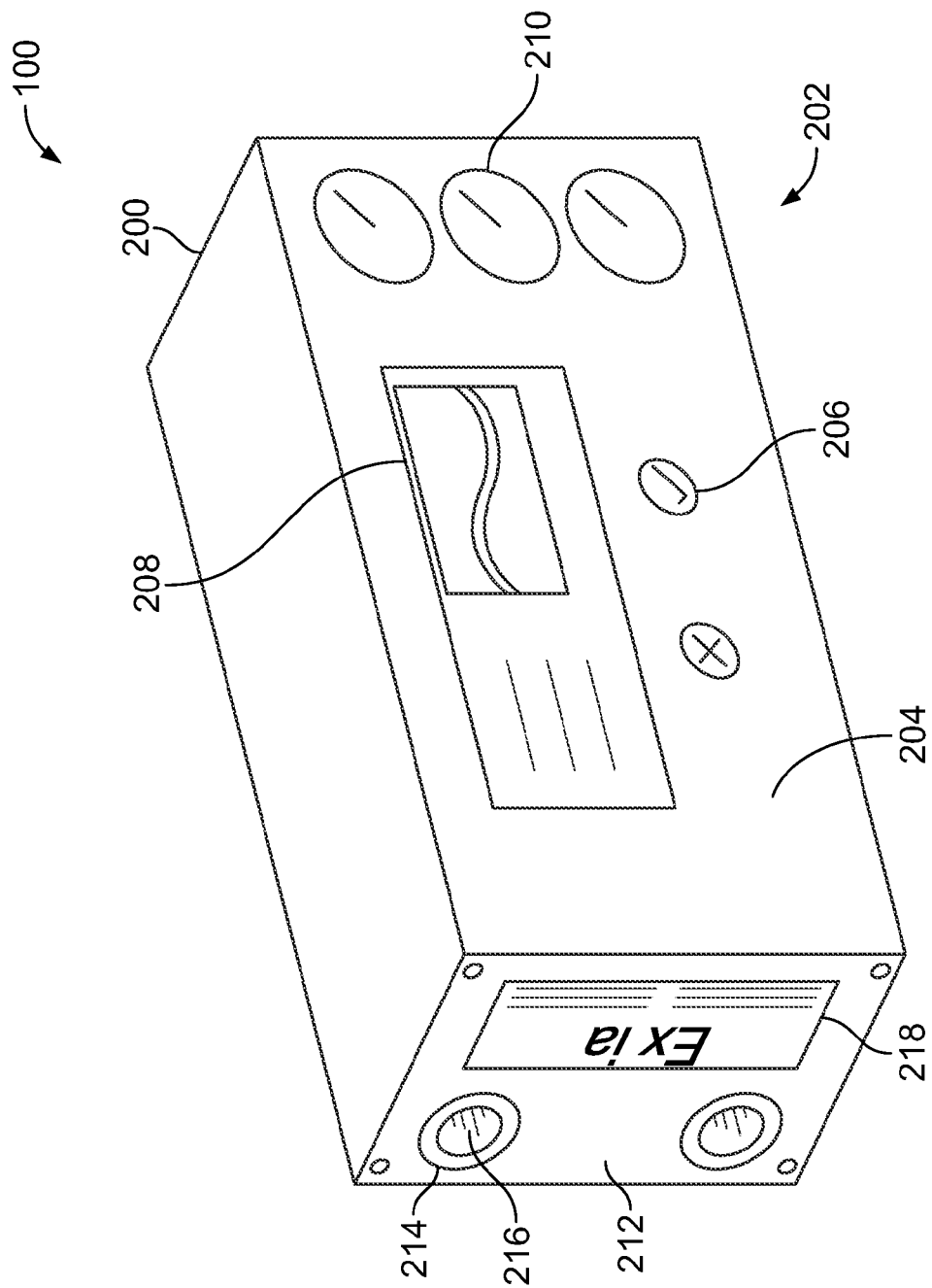
FIG. 2 is a perspective view of a base enclosure of the example modular instrument of FIG. 1.

FIG. 2 illustrates a base enclosure 200 of the example modular instrument 100 described herein. As illustrated in FIG. 2, the base enclosure 200 includes gauges and/or indicators 202 that are disposed within the base enclosure 200 and visible from a front surface 204 of the base enclosure 200. For example, the indicators 202 include indicator lights 206 to indicate that power is being supplied to the base enclosure 200, a display 208 to show a position of the diaphragm of the actuator 106 and/or the valve plug of the fluid valve 104, and gauges 210 to show incoming and outgoing pressure of the example modular instrument 100. Other electrical equipment such as an I/P (current-pressure) converter and/or a printed circuit board (PCB) are also disposed within the base enclosure 200, for example. As illustrated in FIG. 2, a side surface 212 of the base enclosure 200 is adjacent the front surface 204. For example, first conduits 214 are coupled to openings 216 defined by the side surface 212 of the base enclosure 200. The first conduits 214 are to receive wiring. For example, the wiring may power the modular instrument 100, provide signals from a sensor and/or enable the modular instrument 100 to control the control fluid provided to the actuator 106.

As illustrated in FIG. 2, the first label 218 is coupled to the side surface 212 of the base enclosure 200 adjacent the first conduits 214 in accordance with various safety standards (e.g., the NEC, the CEC, and the IEC International Standards) set forth by third party agencies (e.g., the NFPA, FM Global, the CSA, ATEX, and the IEC). The first label 218 indicates that the base enclosure 200 has a first characteristic that satisfies the safety standards required of equipment installed in the first category of hazardous locations. In accordance with the standards of the third party agencies, the first label 218 coupled to the base enclosure 200 is composed of stainless steel or vinyl, for example. The first label 218 is fixed to the base enclosure 200 via fasteners and/or by applying adhesive to the first label 218. The first label 218 is fixed to the base enclosure 200 by a person approved by the third party agency (e.g., the manufacturer of the base enclosure 200) at a site approved by the third party agency (e.g., the manufacturing site of the base enclosure 200).

The base enclosure 200 of the illustrated example satisfies the safety standards set forth for instruments installed in a hazardous location having a first category. For example, the first characteristic of the base enclosure 200 may be a non-incendive rating and/or an intrinsically-safe rating. In such examples, the first label 218 indicates that the base enclosure has a non-incendive rating and/or an intrinsically-safe rating. Accordingly, when the control valve assembly 102 is installed in the first category of hazardous locations, the base enclosure 200 of the modular instrument 100 is installed in the first category without an additional enclosure of the example modular instrument 100.

Figure 3:
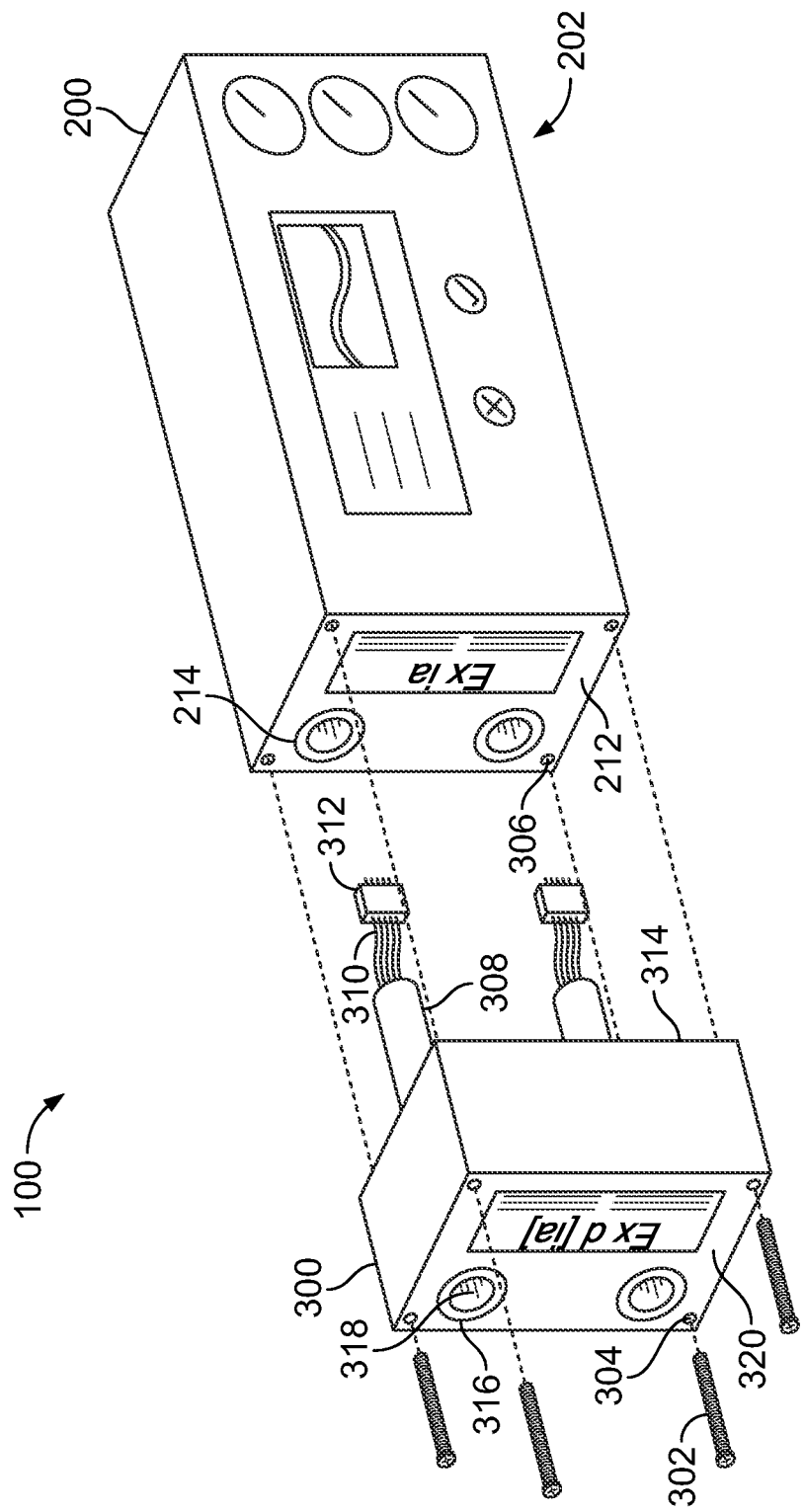
FIG. 3 is a perspective view of a secondary enclosure uncoupled from the base enclosure of the example modular instrument of FIGS. 1-2.

FIG. 3 illustrates a secondary enclosure 300 that is to be coupled to the base enclosure 200 when the example modular instrument 100 is installed in a second category or type of hazardous location. As illustrated in FIG. 3, the secondary enclosure 300 is to couple to the side surface 212 of the base enclosure 200 via fasteners 302. Each fastener 302 is to extend through a respective first aperture 304 of the secondary enclosure 300 and is to be threadably received by a respective second aperture 306 in the side surface 212 of the base enclosure 200. As illustrated in FIG. 3, barriers 308, wiring 310, and a wiring harness 312 extend from a first surface 314 of the secondary enclosure 300 and are to be received by the respective first conduits 214 of the base enclosure 200. Second conduits 316 are coupled to openings 318 defined by a second surface 320 of the secondary enclosure 300 opposite the first surface 312, for example.

Terminals may be disposed in the secondary enclosure 300 to receive wiring via the second conduits 316 and may be electrically coupled to electrical components of the base enclosure 200 via the wiring 310 and the wiring harness 312 of the second enclosure 300. For example, the wiring received by the second enclosure 300 is to power the modular instrument 100, provide signals from a sensor and/or wiring to enable the modular instrument 100 to control the control fluid provided to the actuator 106. When the secondary enclosure 300 is coupled to the base enclosure 200, the wiring received by the secondary enclosure 300 is electrically coupled to the indicators 202, the I/P converter, and/or the PCB of the base enclosure 200, for example. Because the secondary enclosure 300 of the illustrated example does not include electrical components required to control the control valve assembly 102 (e.g., the electrical components of the base enclosure 200), the secondary enclosure 300 of the illustrated example is installed when coupled to the base enclosure 200 or another enclosure of the modular instrument 100.

Figure 4:
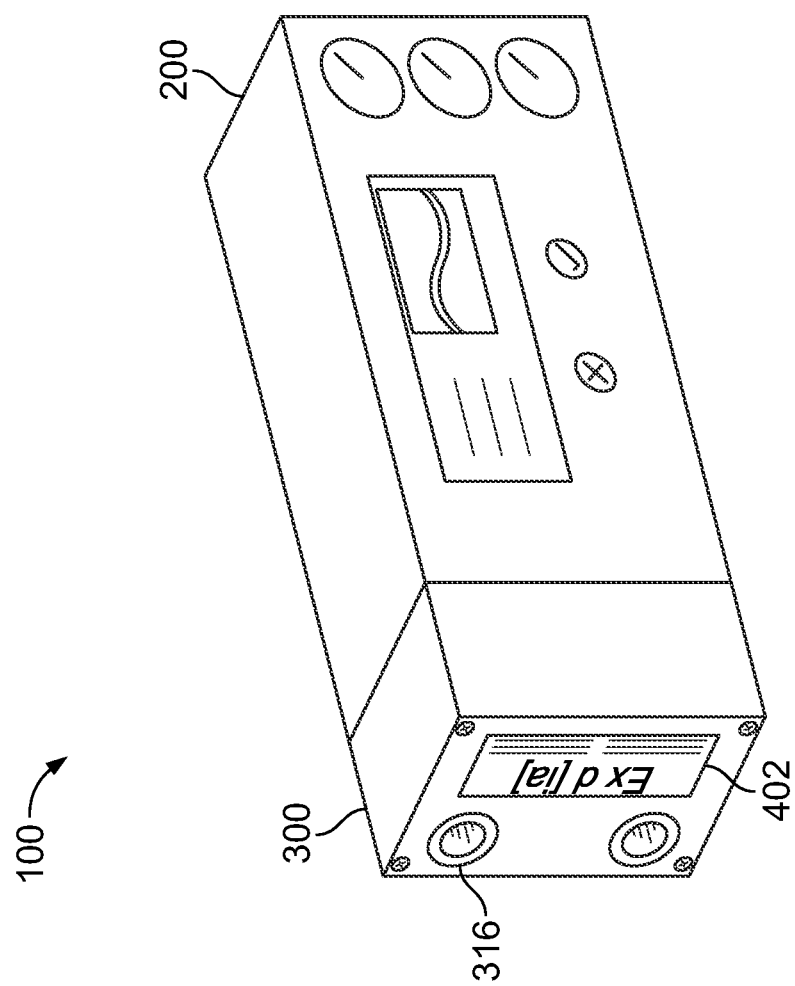
FIG. 4 is a perspective view of the secondary enclosure coupled to the base enclosure of the modular instrument of FIGS. 1-3.

FIG. 4 illustrates the modular enclosure 100 when the secondary enclosure 300 is coupled to the base enclosure 200. For example, the modular instrument 100 of FIG. 4 has a second characteristic that satisfies the safety standards set forth by third party agencies for equipment installed in the second category of hazardous locations. Thus, by coupling the secondary enclosure 300 to the base enclosure 200, the modular instrument 100 can be installed in the second category of hazardous locations. For example, the modular instrument 100 of FIG. 4 has an explosion-proof rating when the secondary and base enclosures 300 and 200 are coupled together and, thus, can be installed in hazardous locations that require explosion-proof equipment. When the second characteristic of the modular instrument 100 of FIG. 4 is an explosion-proof rating, the barrier 308 (FIG. 3) of the secondary enclosure 300 is an intrinsically-safe and/or flameproof barrier and the second conduits 316 prevent any spark or flash from within the modular instrument 100 from igniting the surrounding hazardous environment, for example.

As illustrated in FIG. 4, the second label 402 is fixed to the secondary enclosure 300. For example, the second label 402 is fixed to the second surface 320 of the secondary enclosure 300 adjacent the second conduits 316. The second label 402 indicates the example modular enclosure 100 formed by the secondary and base enclosures 300 and 200 is in accordance with the safety requirements for equipment installed in the second category or type of hazardous location. Because the secondary enclosure 300 of the illustrated example is installed when coupled to the base enclosure 200, the risk of installing the modular instrument 100 in hazardous locations in which the coupled base and secondary enclosures 200 and 300 are not rated is substantially reduced.

The second label 402 of the illustrated example is coupled to the secondary enclosure 300 in accordance with the safety standards (e.g., the NEC, the CEC, and the IEC International Standards) set forth by the third party agencies (e.g., the NFPA, FM Global, the CSA, ATEX, and the IEC). For example, the second label 402 is composed of stainless steel or vinyl. The second label 402 can be fixed to the secondary enclosure 300 via fasteners and/or by applying adhesive to the second label 402. Also in accordance with the safety standards of the third party agencies, the second label 402 is fixed to the secondary enclosure 300 by a person approved by the third party agency (e.g., the manufacturer of the secondary enclosure 300) at a site approved by the third party agency (e.g., the manufacturing site of the secondary enclosure 300).

As illustrated in FIG. 4, the first label 218 (FIGS. 2 and 3) of the base enclosure 200 is covered by the secondary enclosure 300 when the secondary enclosure 300 is coupled to the base enclosure 200. While the first label 218 is no longer visible when the secondary enclosure 300 is coupled to the base enclosure 200, the first label 218 remains fixed to the base enclosure 200. By covering the first label 218 when the secondary enclosure 300 is coupled to the base enclosure 200, the possibility of improperly indicating that the modular instrument 100 is not approved for the hazardous location in which it is installed is substantially reduced.

Thus, because the modular instrument 100 of the illustrated example does not satisfy requirements of a second category of hazardous locations when installed in a first category of hazardous locations, the modular instrument 100 can be tailored to satisfy the safety requirements of various categories or types of hazardous locations in a cost-efficient manner. For example, when the base enclosure 200 is installed without the secondary enclosure 300, the modular instrument 100 meets the safety standards of equipment installed in a first category of hazardous locations. Because the base enclosure 200 does not include equipment required by the safety standards for equipment installed in a second category of safety standards (e.g., the barrier 308 or the second conduits 316 of the secondary enclosure 300), the manufacturing costs of the modular enclosure 100 installed in the first category of hazardous locations is substantially reduced.

Alternatively, when the modular instrument 100 is modified by coupling the secondary enclosure 300 to the base enclosure 200, the modular instrument 100 meets the requirements of equipment installed in a second category of hazardous locations. In other words, the modular enclosure 100 changes from having a first rating associated with the first category of hazardous locations to a second rating associated with the second category of hazardous locations. For example, the secondary enclosure 300 includes the barrier 308 and the second conduits 316 to satisfy the requirements of equipment installed in the second category of hazardous locations. Because the second label 402 is visible and the first label 218 is not visible when the secondary and base enclosures 300 and 200 are coupled together, the modular instrument 100 is properly labeled when installed in the second environment of hazardous locations.

Figure 5:
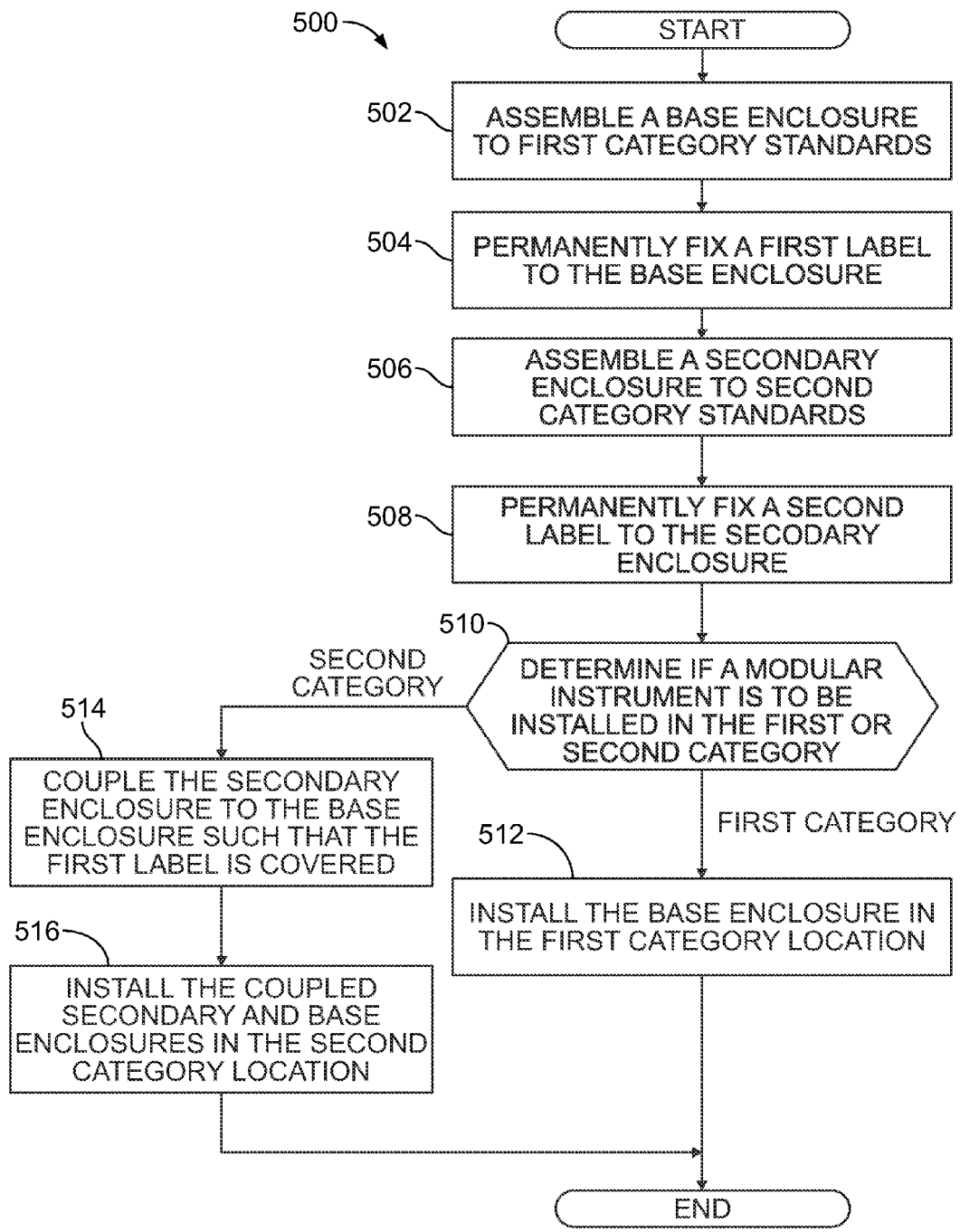
FIG. 5 is a flowchart of an example method to assemble the example modular instrument disclosed herein.

FIG. 5 is a flowchart representative of an example method 500 for assembling an example modular instrument. Although the example method 500 is described with reference to the flowchart illustrated in FIG. 5, many other methods of assembling an example modular instrument may alternatively be used. For example, the order of execution of the blocks may be changed, and/or some of the blocks described may be changed, eliminated, or combined.

The example method 500 for assembling an example modular instrument is discussed in connection with the example modular instrument 100 of FIGS. 1-4. Because the example method 500 may be used to assemble the example modular instrument 100 of FIGS. 1-4, those components identified in FIGS. 1-4 having functions substantially similar or identical to the functions of components described below will not be described in detail again. Instead, the same reference numbers will be used for like structures.

The example method 500 disclosed herein may start by assembling a base enclosure 200 having a first characteristic in accordance with the safety standards required for equipment installed in a first category of hazardous locations (block 502). In accordance with standards set forth by third party agencies, the first label 218 that indicates the base enclosure 200 satisfies such safety standards is then fixed to an outer surface of the base enclosure 200 (block 504). For example, the first label 218 may be fixed to the side surface 212 of the base enclosure 200 via fasteners and/or by applying adhesive to the first label 218. To satisfy the safety standards set forth by the third party agencies, the first label 218 is fixed by a person approved by the third party agency (e.g., the manufacturer of the base enclosure 200) at a site approved by the third party agency (e.g., the manufacturing site of the base enclosure 200).

A secondary enclosure 300 that is to be coupled to the base enclosure 200 is assembled in accordance with the safety standards required for equipment installed in a second category of hazardous locations different than the first category of hazardous locations (block 506). When the secondary enclosure 300 is coupled to the base enclosure 200, the modular instrument 100 has a second characteristic that satisfies the requirements of equipment installed in the second category of hazardous locations. After the secondary enclosure 300 is assembled and in accordance with the standards set forth by the third party agencies, the second label 402 is fixed to an outer surface of the base enclosure 200 via fasteners and/or by applying adhesive to the second label 402 (block 508). The second label 402 indicates that the modular instrument 100 meets the standards of equipment installed in the second category of hazardous locations when the secondary enclosure 300 is coupled to the base enclosure 200. For example, the second label 402 may be permanently fixed to the second surface 320 of the secondary enclosure 300. To satisfy the requirements of the third party agencies, the second label 402 is permanently fixed to the secondary enclosure 300 by a person approved by the third party agency (e.g., the manufacturer of the secondary enclosure 300) at a site approved by the third party agency (e.g., the manufacturing site of the secondary enclosure 300). As illustrated in FIG. 5, the secondary enclosure 300 may be assembled after the base enclosure 200 is assembled. Alternatively, the secondary enclosure 300 may be assembled before or in parallel with the assembly of the base enclosure 200.

The example method 500 then determines whether the modular instrument 100 is to be installed in the first or second category of hazardous locations (block 510). If the modular instrument 100 is to be installed in the first category of hazardous locations, the base enclosure 200 of the modular instrument 100 is installed without coupling the secondary enclosure 300 to the base enclosure 200 (block 512). Alternatively, if the modular instrument 100 is to be installed in the second category of hazardous locations, the secondary enclosure 300 is coupled to the base enclosure 200 such that the first label 218 is covered by the secondary enclosure 300 (block 514). When the secondary enclosure 300 is coupled to the base enclosure 200, terminals disposed within the secondary enclosure 300 are electrically coupled to electrical components disposed within the base enclosure 200, for example. By coupling the secondary and base enclosures 300 and 200, a rating of the modular instrument 100 changes from a first rating (e.g., non-incendive and/or intrinsically-safe) to a second rating (e.g., explosion-proof). The modular instrument 100 is subsequently installed in the second category of hazardous locations with the secondary enclosure 300 coupled to the base enclosure 200 (block 516). Covering the first label 218 with the secondary enclosure 300 prevents the modular instrument 100 from being improperly labeled when installed in the second category of hazardous locations. For example, covering the first label 218 with the secondary enclosure 300 prevents the first label 218 from indicating that the modular instrument 100 is not approved to be installed in the second category of hazardous locations.

Although certain example apparatus and methods have been described herein, the scope of coverage of this patent is not limited thereto. On the contrary, this patent covers all methods, apparatus and articles of manufacture fairly falling within the scope of the amended claims either literally or under doctrine of equivalents.

What is claimed is:

1. An apparatus comprising:
    a first enclosure having a first characteristic;
    a first label indicative of the first characteristic and fixed to an outer surface of the first enclosure;
    a second enclosure to couple to the first enclosure, the second enclosure to cover the first label when the second enclosure is coupled to the first enclosure, the first and second enclosures having a second characteristic when the second enclosure is coupled to the first enclosure;
    a second label indicative of the second characteristic and fixed to an outer surface of the second enclosure, the second label to be exposed when the second enclosure is coupled to the first enclosure;
    an electrical component disposed in the first enclosure; and
    a terminal disposed in the second enclosure, the terminal to electrically couple to the electrical component when the second enclosure is coupled to the first enclosure.

2. The apparatus of claim 1, wherein the first characteristic is different than the second characteristic.

3. The apparatus of claim 2, wherein the second characteristic is an explosion-proof rating.

4. The apparatus of claim 2, wherein the first characteristic is an intrinsically safe rating or a non-incendive rating.

5. The apparatus of claim 1, wherein the first and second labels are composed of stainless steel or vinyl.

6. The apparatus of claim 1, wherein the first enclosure comprises an opening to enable the terminal of the second enclosure to electrically couple to the electrical component of the first enclosure.

7. The apparatus of claim 6, wherein the first label is adjacent the opening.

8. The apparatus of claim 1, wherein the first label remains fixed to the first enclosure when the first enclosure receives the second enclosure.

9. An apparatus comprising:
    first means for enclosing having a first characteristic;
    first means for labeling associated with the first characteristic and coupled to an outer surface of the first means for enclosing;
    second means for enclosing to couple to the first means for enclosing, the second means for enclosing to cover the first means for labeling when the second means for enclosing is coupled to the first means for enclosing, the first and second means for enclosing having a second characteristic when the second means for enclosing is coupled to the first means for enclosing;
    second means for labeling associated with the second characteristic and coupled to an outer surface of the second means for enclosing, the second means for labeling to be exposed when the second means for enclosing is coupled to the first means for enclosing;
    means for wiring disposed in the first means for enclosing; and
    means for receiving the means for wiring disposed in the second means for enclosing, the means for receiving to electrically couple to the means for wiring when the second means for enclosing is coupled to the first means for enclosing.

10. The apparatus of claim 9, wherein the first characteristic is different than the second characteristic.

11. The apparatus of claim 10, wherein the first means for labeling is coupled to the first means for enclosing to identify that the first means for enclosing has an intrinsically-safe rating and the second means for labeling is coupled to the second means for enclosing to identify that the first means for enclosing and the second means for enclosing have an explosion-proof rating when coupled together.

* * * * *